(12) United States Patent
Roehrig et al.

(10) Patent No.: US 8,286,481 B2
(45) Date of Patent: Oct. 16, 2012

(54) FLUID METER BODY WITH MODULAR TRANSDUCER HOUSING

(75) Inventors: Daniel Roehrig, East Islip, NY (US); Joseph J. Wuthijaroen, Lindenhurst, NY (US)

(73) Assignee: Siemens Aktiengesellschaft, Munich (DE)

( * ) Notice: Subject to any disclaimer, the term of this patent is extended or adjusted under 35 U.S.C. 154(b) by 146 days.

(21) Appl. No.: 12/899,661

(22) Filed: Oct. 7, 2010

(65) Prior Publication Data

US 2012/0085164 A1    Apr. 12, 2012

(51) Int. Cl.
    *G01F 15/14*    (2006.01)
(52) U.S. Cl. .......................................... 73/273
(58) Field of Classification Search ............ 73/856–860, 73/861.19–861.31, 861.18, 861.27, 273
See application file for complete search history.

(56) References Cited

U.S. PATENT DOCUMENTS

| | | | | |
|---|---|---|---|---|
| 5,131,278 | A | * | 7/1992 | Baumoel ..................... 73/861.18 |
| 5,515,733 | A | * | 5/1996 | Lynnworth ................. 73/861.27 |
| 7,458,279 | B2 | | 12/2008 | Hogendoorn |

OTHER PUBLICATIONS

PCT International Search Report mailed Dec. 19, 2011 corresponding to PCT International Application No. PCT/US2011/053380 filed Sep. 27, 2011 (13 pages).

* cited by examiner

*Primary Examiner* — Jewel V Thompson

(57) ABSTRACT

A mount and housing for fluid meter components, including transducers, is directly coupled to fixation points on a pipe exterior circumference without external straps. The mount may be selectively coupled and decoupled from the pipe fixation points. One or more mounts and housings may be arrayed on a pipe exterior in modular fashion, for different metering applications. Similarly, the mount and housing interior optionally may be reconfigurable in modular fashion for orientation and alignment of one or a plurality of transducers or other components for different user applications, without the need for auxiliary alignment tools, templates, measuring instruments or other devices.

22 Claims, 7 Drawing Sheets

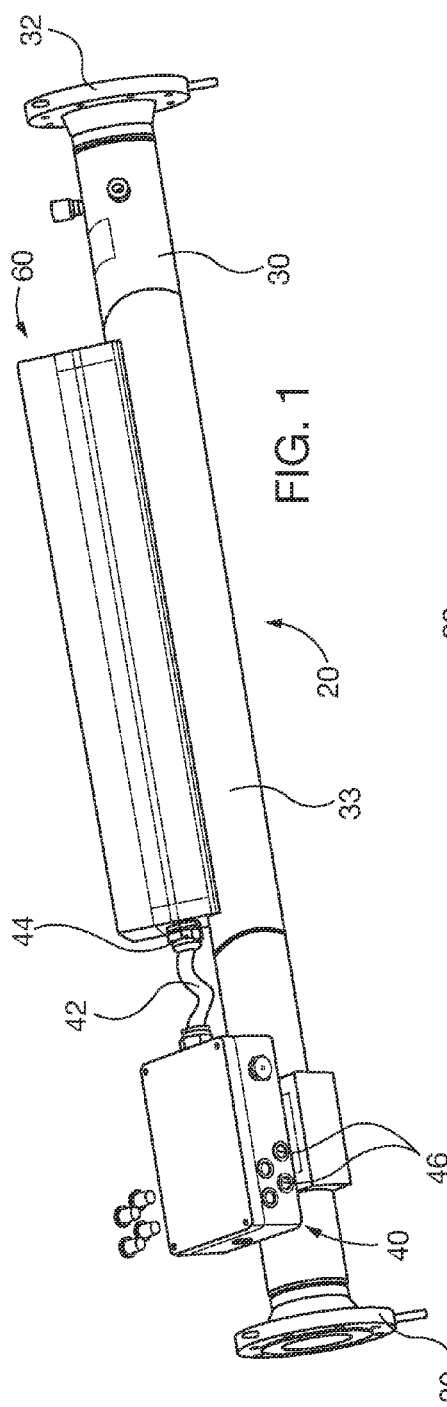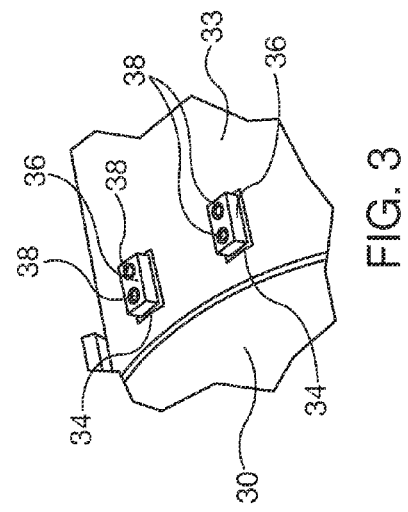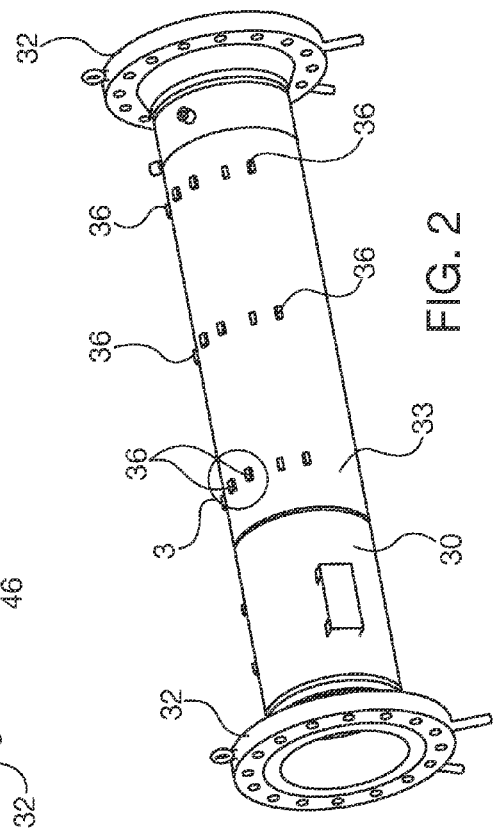
FIG. 1
FIG. 2
FIG. 3

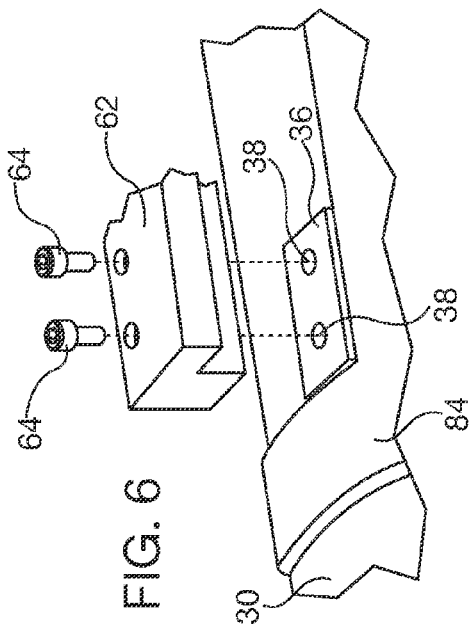
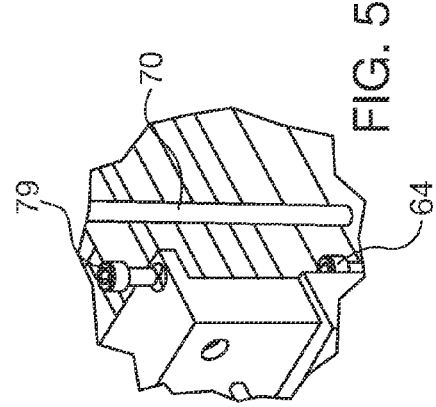
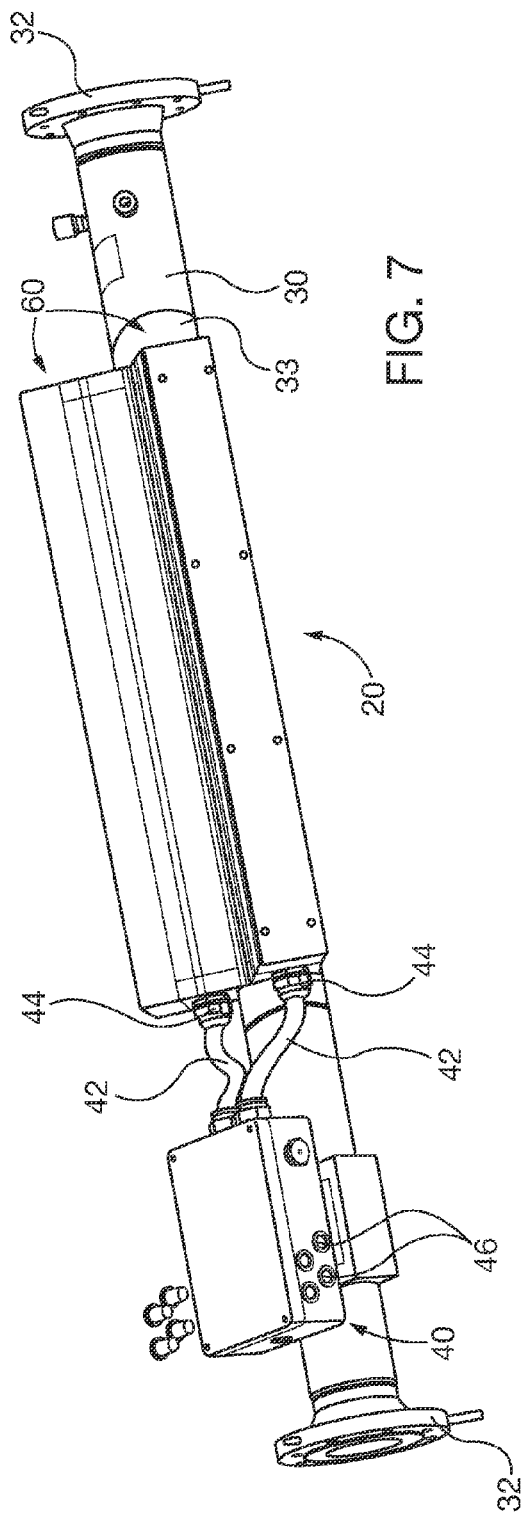

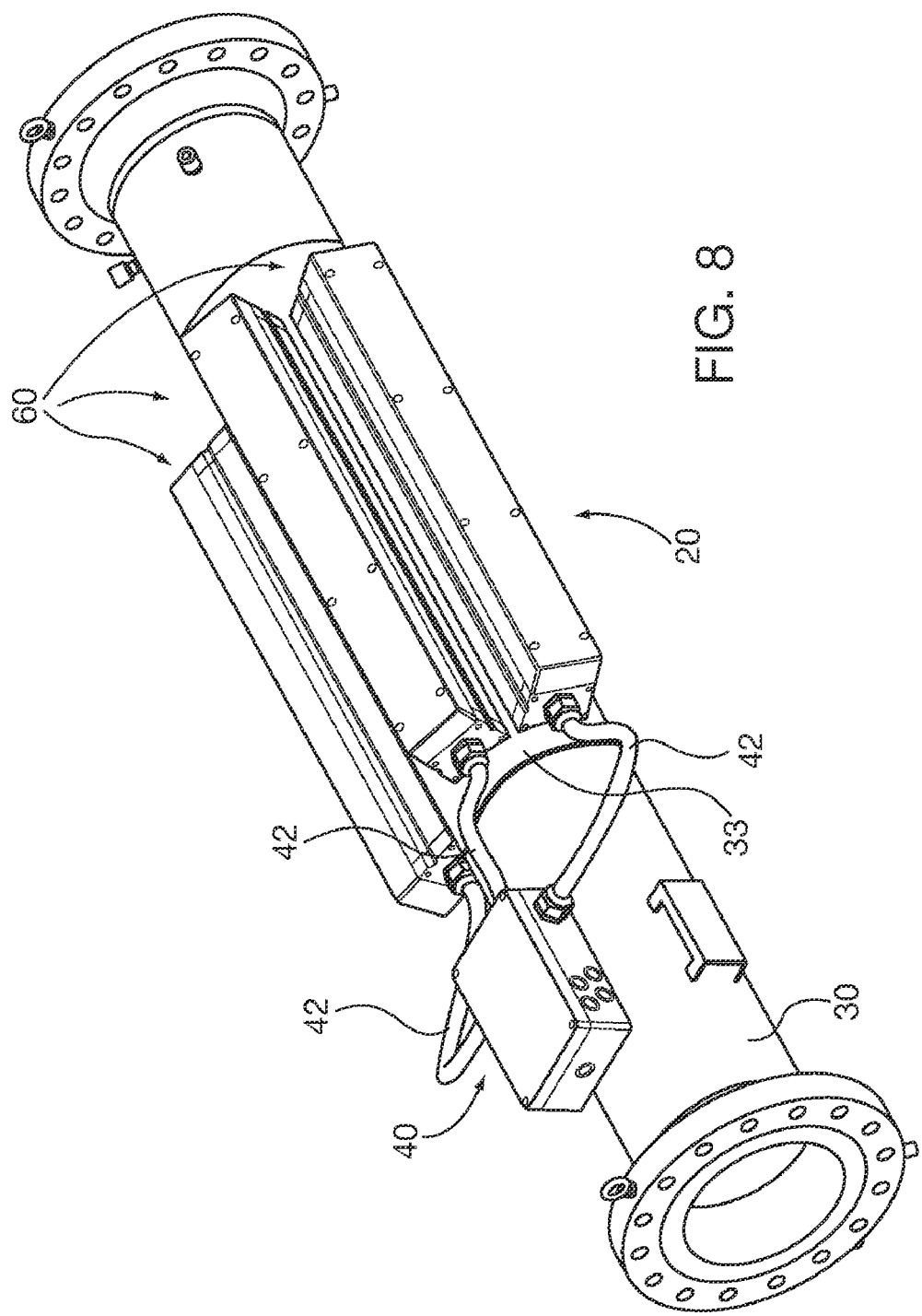

FLUID METER BODY WITH MODULAR TRANSDUCER HOUSING

BACKGROUND OF THE DISCLOSURE

1. Field of the Invention

The present invention relates to fluid flow monitor transducer mounts and housings for mounting a transducer on an exterior surface of a fluid pipe, and particularly to fluid meter body mounts including housings for isolating a transducer mounted therein from the environment.

2. Description of the Prior Art

Typically fluid flow monitoring and other types of transducers are mounted on a pipe circumference with tensioned straps that engage the pipe circumferential surface by friction interference. Pipe straps are relatively difficult to mount about a pipe circumference, especially for relatively larger pipes having diameters greater than 12 inches (270 millimeters). Housings may need to be strapped to pipes in difficult to service locations in service trenches, overhead or behind enclosure walls. Often multiple service technicians are needed to install a transducer, strap-type mount. Difficulties do not end upon installation.

Strap-type pipe mounts require periodic inspection and re-tensioning due to, among other maintenance challenges, the host pipe's thermal cycling, ambient weather temperature cycling and pipe vibration pulsations. As identified above, pipe location and orientation may present difficulties for service technicians to maneuver, and the piping may also be located in hostile environments. Thus it is desirable to minimize effort necessary to mount and service transducers and other types of equipment on piping.

Another challenge faced by field service technicians regarding pipe transducer mounts is the need to calibrate precise orientation of transducers relative to the pipe. In the past, such orientation calibration has been performed with the aid of auxiliary measuring instruments, such as scales or vernier calipers, or with alignment templates/jigs. It is desirable to minimize the quantity and complexity of auxiliary instruments and other tools needed for a technician to install and service transducers in the field, as well as installation effort. Again, field piping location and environmental conditions complicate transducer orientation and calibration as they complicate mounting and servicing of housing strapping.

Another challenge faced by field service technicians regarding pipe transducer mounts is the need to isolate and seal instrumentation components within the housing from the external environment (e.g., rain, dirt, dust infiltration) reliably for many field applications, and maintain the sealed condition reliably.

Thus, a need exists in the art for a transducer external pipe mounting and housing structure that is easy to install and that requires little or no follow-up periodic maintenance or inspection to assure continued proper alignment and tensioning on the pipe.

Another need exists in the art for a transducer external pipe mounting and housing structure that minimizes need for transducer orientation and calibration auxiliary tools or instruments during factory or field installation, servicing or replacement of a transducer.

Yet another need exists in the art for a transducer external pipe mounting and housing structure that seals the internal components from the environment reliably with minimal service upkeep.

SUMMARY OF THE INVENTION

Accordingly, an object of the invention is to create a transducer external pipe mounting and housing structure that is easy to install and that requires little or no follow-up periodic maintenance or inspection to assure continued proper alignment and tensioning on the pipe.

Another object of the present invention is to create a transducer external pipe mounting and housing structure that minimizes need for transducer orientation and calibration auxiliary tools or instruments during factory or field installation, servicing or replacement of a transducer.

An additional object of the present invention is to create a transducer external pipe mounting and housing structure that seals internal components from the external environment outside the housing reliably during initial installation, with minimum service upkeep.

These and other objects are achieved in accordance with the present invention by an external pipe mount and housing for transducers and the like that is affixed directly to a pipe exterior without the need for circumferential straps. The mount includes bottom mounting bars engaged with mating mounting point tabs affixed to the pipe exterior circumference. The mounting point tabs may be oriented in an array about the pipe circumference for modular reconfiguration for different applications. The bar and tab engagement eliminate the need for housing frequent periodic tensioning and alignment inspection. The bottom mounting bars provide a rigid base for attachment of a transducer and housing enclosure. The housing enclosure desirably may be sealed from the outside environment with sealing gaskets.

The transducer housing structure provides for an array of integral transducer alignment point indexing features, and associated mounting hardware that obviate the need for auxiliary alignment instruments and tools. A service technician need only align the transducer with a designated indexing feature and thereafter secure the transducer in the housing. Indexing indicia may be associated with the indexing features in order to assist a service technician with identification of the correct alignment position for any given transducer.

The present invention features a fluid meter body, comprising a pipe for conveyance of fluid, having an exterior circumferential surface defining a mounting point. A bottom bar is directly affixed to the mounting point by a selectively attachable and detachable coupling device. A housing is coupled to the mounting bar, for selective attachment of a fluid meter transducer thereto.

Another aspect of the present invention features a fluid meter body, comprising a pipe for conveyance of fluid, having an exterior circumferential surface defining an array of a plurality of mounting points. A pair of generally parallel bottom bars are selectively oriented in spaced apart fashion generally axially along the pipe exterior circumference. The bars are directly affixed to the mounting point array by selectively attachable and detachable coupling devices. A housing is coupled to the mounting bar, for selective attachment of a fluid meter transducer thereto.

The present invention is also directed to a method for selectively configuring a modular fluid meter body by providing a pipe for conveyance of fluid, having an exterior circumferential surface defining an array of a plurality of mounting points. A pair of generally parallel bottom bars are selectively oriented with selected mounting points of the array in spaced apart fashion generally axially along the pipe exterior circumference. The bottom bars are affixed directly to the selected mounting points of the array with selectively attachable and detachable coupling devices, such as threaded fasteners. The next step is coupling a housing to the mounting bars, the housing having a pair of side walls coupled respectively to each respective bottom bar. At least one of the side walls has an array of a plurality of transducer alignment points, adapted for selective orientation and alignment of a transducer. At least one transducer is selectively oriented and aligned in the housing with a selected one of the alignment points, and is then affixed to that alignment point.

One or more of the objects, aspects and features of the present invention may be practiced jointly or severally at the discretion of one skilled in the art.

BRIEF DESCRIPTION OF THE DRAWINGS

The teachings of the present invention can be readily understood by considering the following detailed description in conjunction with the accompanying drawings, in which:

FIG. 1 shows a schematic perspective view of a meter body mounted on a pipe external circumference with a mount and housing of the present invention;

FIGS. 2 and 3 are perspective views of an exemplary meter body pipe including mounting tabs of the present invention;

FIGS. 4-6 are exploded perspective views of the transducer mount and housing of the present invention;

FIGS. 7-9 are schematic perspective views similar to FIG. 1, showing mounting of pluralities 2, 3 and 4 transducer mounts and housings of the present invention about the circumference of a pipe;

To facilitate understanding, identical reference numerals have been used, where possible, to designate identical elements that are common to the figures.

DETAILED DESCRIPTION

Figure 4:
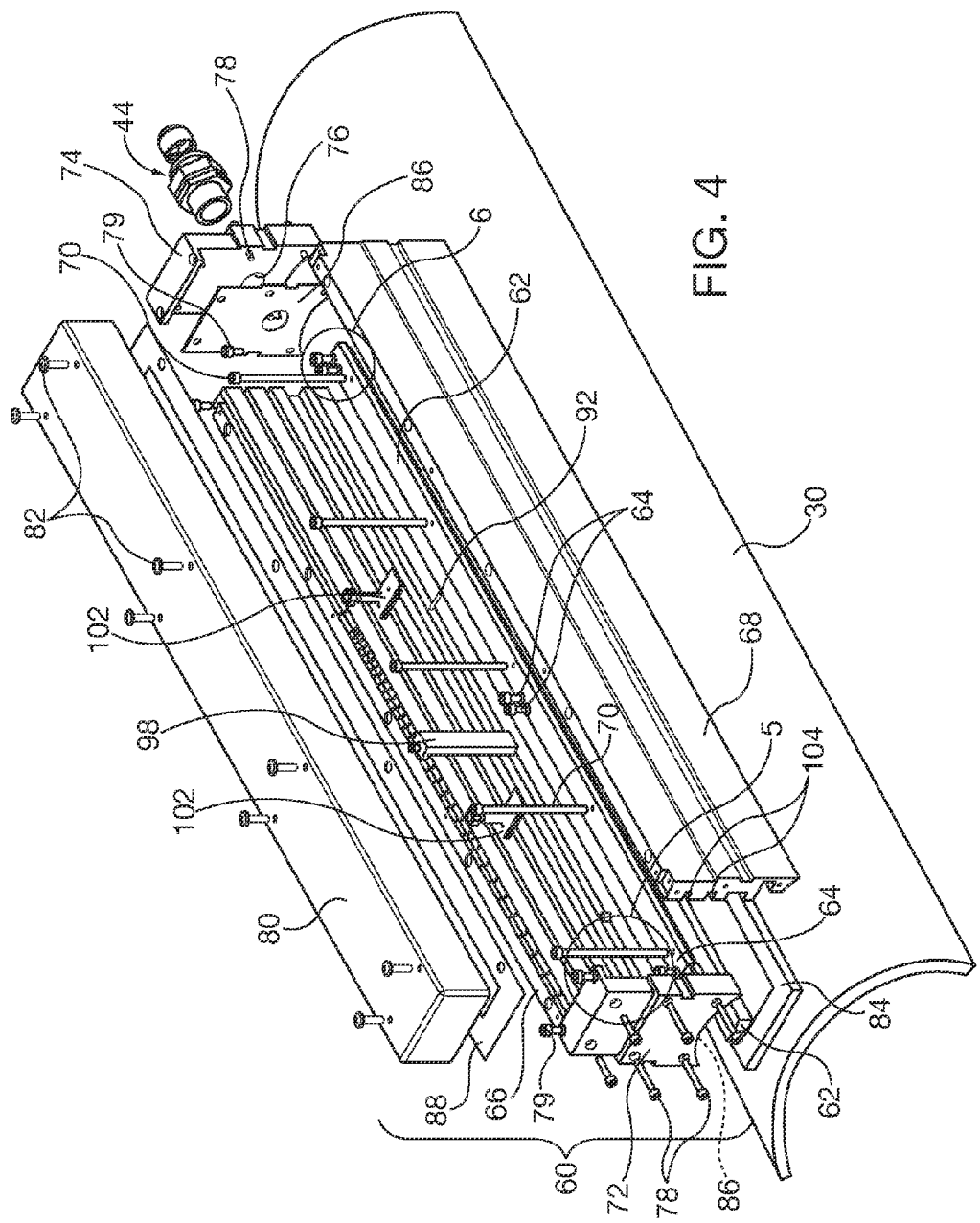

After considering the following description, those skilled in the art will clearly realize that the teachings of the present invention can be readily utilized in mounts and housings for attachment to pipe external surfaces, including for.

Referring to FIG. 1, the present invention is shown in a fluid flow meter body 20 including a pipe 30 with flanges 32 that are adapted for serial connection within piping intended to convey and transport fluids; for example a natural gas pipeline. Optionally, a portion of the pipe 30 circumference may be wrapped or otherwise coated with a known sound damping material 33, in order to reduce external noise influence within the pipe interior zone monitored by the meter. The meter body 20 includes a junction box 40 that is intended for remote communications and/or control connection to monitoring and control systems. The meter body 20 also includes a transducer enclosure 60 of the present invention, intended to house one more meter transducers of known construction, capable of acquiring information about properties of fluid conveyed within the pipe 30. The junction box 40 is communicatively coupled to the transducer enclosure 60 by cable 42 and mechanically coupled by cable gland assembly 44. Wiring apertures 46 enable communicative connection of the junction box 40 to known remote communications and/or control devices (not shown). The transducer enclosure 60 or the junction box 40 may also house one or more other communications, control and metering devices.

Figure 9:
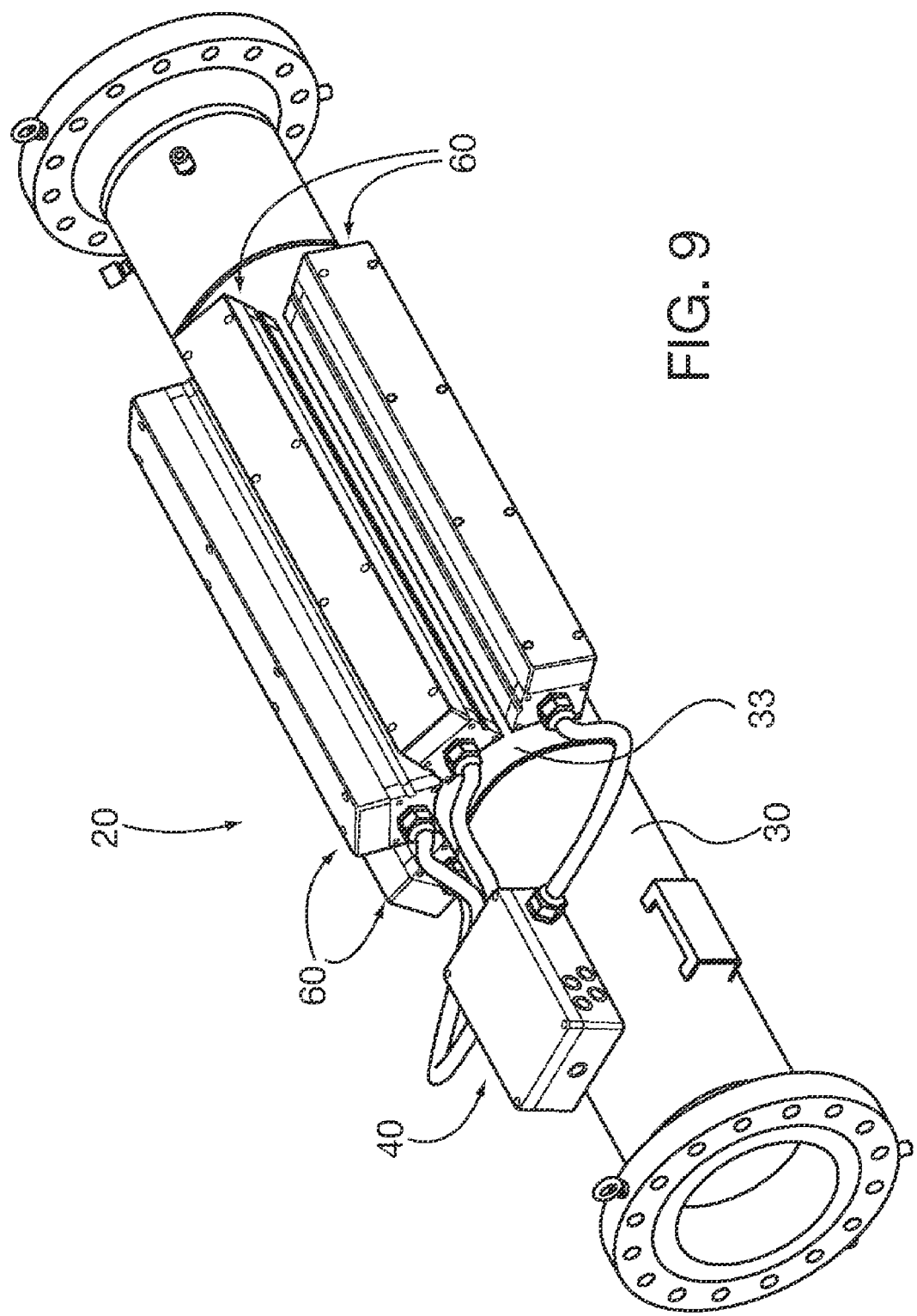
Figure 10:
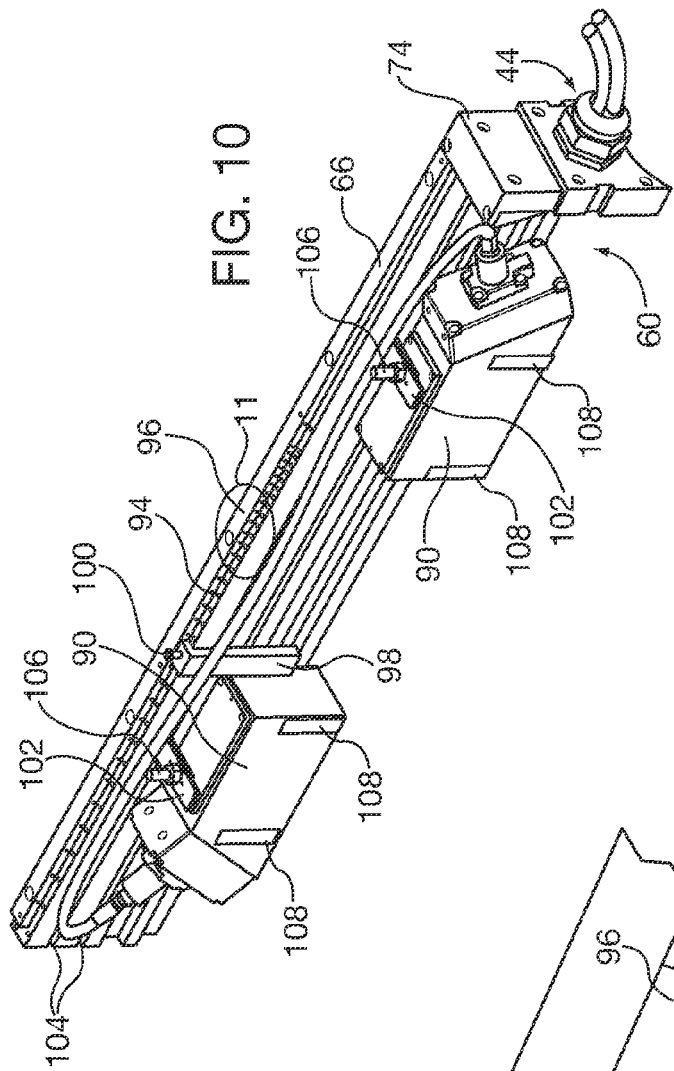
FIG. 10 is a perspective view of the housing of the present invention showing an integral transducer alignment feature of the present invention.
Figure 11:
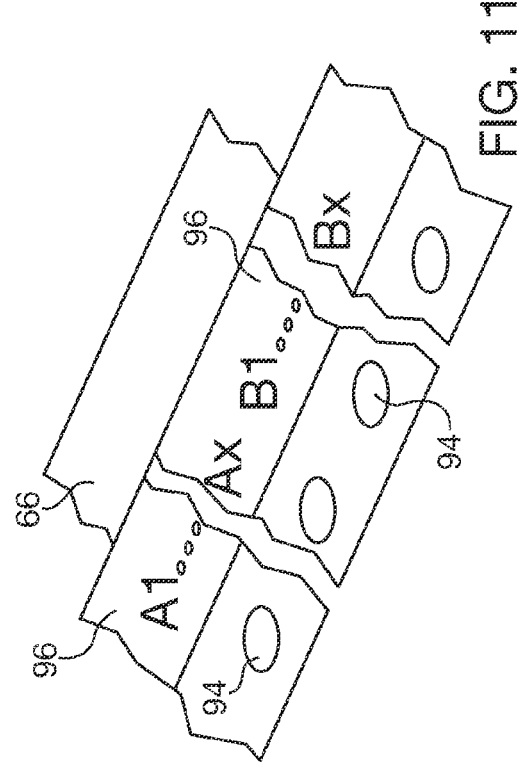
FIG. 11 is detailed view of FIG. 10, showing exemplary transducer alignment features and related alignment indicia.
Figure 12:
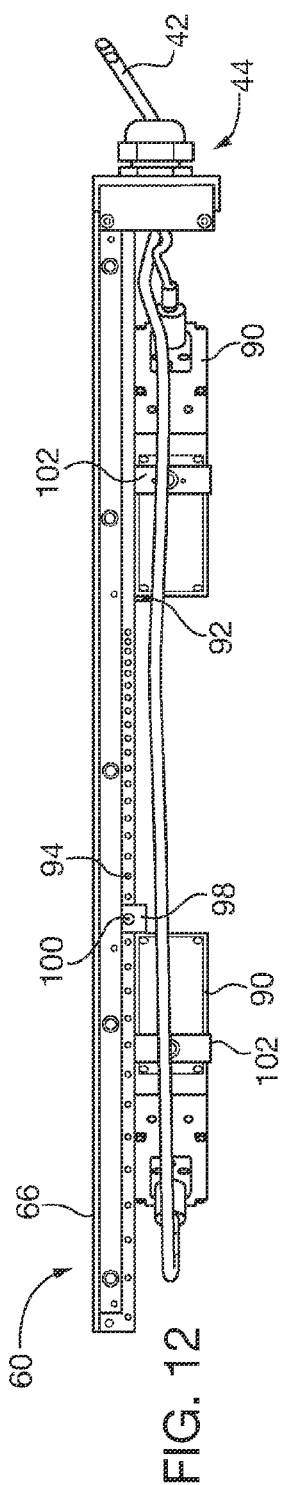
FIG. 12 is a top plan view of FIG. 10.
Figure 13:
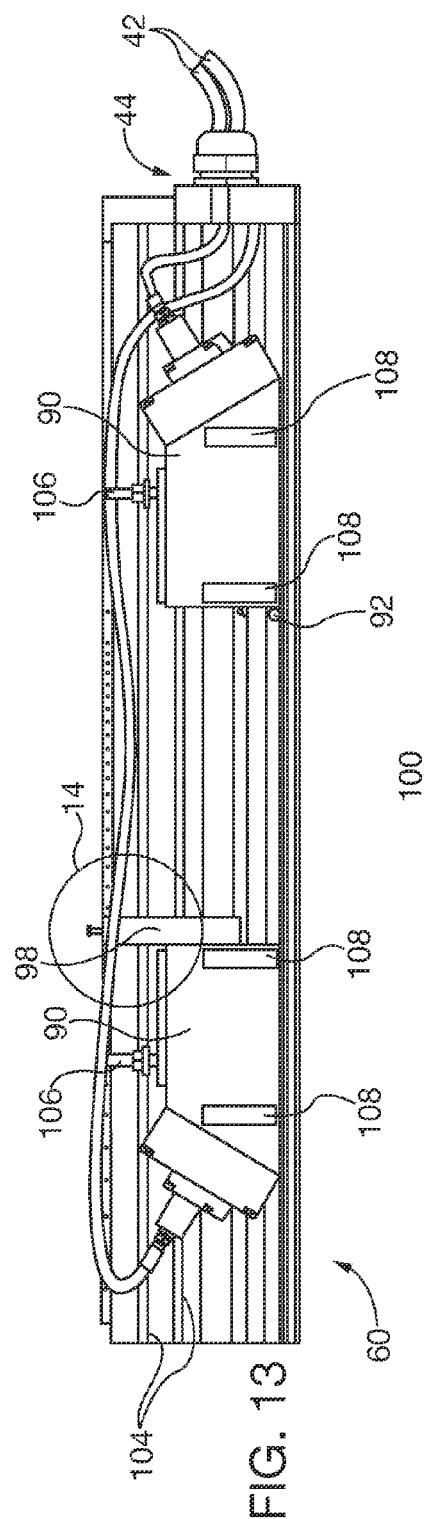
FIG. 13 is a side elevational view of FIG. 10.
Figure 14:
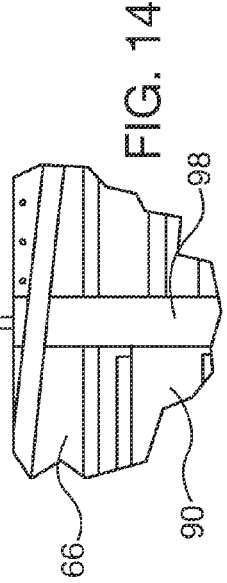
FIG. 14 is a detailed elevational view of exemplary transducer alignment hardware of the present invention.

The meter body 20 of the present invention does not mount transducer enclosure 60 to the pipe 30 with commonly utilized adjustable tensioned circumferential straps or by permanent weldments. Rather, as shown in FIGS. 2 and 3, the transducer enclosure 60 is advantageously selectively and directly affixed to the pipe 30 outer circumference, and selectively removable at a later time. In this exemplary embodiment, the pipe 30 outer circumference has integral mounting points for affixation of the enclosure. As shown in FIGS. 2 and 3, exemplary integral mounting points are flat pipe notches 34, to which are permanently attached welded mounting tabs 36 including drilled and tapped holes for receiving male threaded fasteners. Alternatively threaded or unthreaded male bosses can be attached to the pipe 30 outer circumference, or fixation structure can be formed in place on the pipe 30. Integral mounting points may also comprise integral pedestals formed in place by known casting, swedging, machine cutting or broaching processes. As shown in FIG. 2, a plurality of mounting tabs 36 may be arrayed on the pipe 30 outer circumference to enable selective modular mounting of one or more transducer enclosures 60, as shown in FIGS. 7-9.

The structure and attachment of transducer housing 60 to pipe 30 is shown in FIGS. 4-6. Bottom bar 62 is selectively and rigidly affixed to one or more of the pipe mounting tabs 36 with bottom bar fasteners 64 that engage in the female threaded holes 38, with exemplary mounting detail shown in FIG. 6. As shown in FIG. 4, the bottom bar 62 affixes to a plurality of mounting tabs 36. At least one, and preferably two, bottom bars 62 are aligned in parallel axially about the outer circumference of pipe 30 and provide a mounting foundation for other housing and meter components.

Side rails 66, 68 form side walls and mounting surface structure for the transducer enclosure 60. The side rails 66, 68 are attached to a corresponding bottom bar 62 by side rail fasteners 70. As shown in FIGS. 4 and 5, the side rail fasteners 70 preferably have sufficient length to project distally from the pipe outer surface through the side rails. Elongated fasteners 70 provide lateral structural load integrity to the housing enclosure 60 side rails and enable easier engagement by a service technician on an outer face of the corresponding side rail. The side rails 66, 68 may be permanently affixed to or integrally formed with the bottom bars 62.

End caps 72, 74 complete housing enclosure side walls on the short ends. End cap 74 has an end cap hole 76 for receipt of the cable gland assembly 44. End caps 72, 74 are coupled to the side rails 66, 68 with end cap fasteners 78 and 79. Cover 80 is attached to the enclosure 60 by way of cover fasteners 82 and isolates the enclosure interior from the environment outside the housing. The enclosure 60 may be made more weather resistant by interposing gaskets and/or sealant beads between respective mating components, such as the exemplary pipe surface gasket 84, end cap gaskets 86 and cover gasket 88.

One or more of the side rails 66, 68, end caps 72, 74 or cover 80, or any subportions thereof may be permanently affixed to or integrally formed with the bottom bars 62. Alternatively, if full environmental enclosure is not needed for an application, any of the end walls, side walls or cover may be eliminated.

The modular construction of the pipe mounting point tabs 36 and the transducer enclosure 60 beneficially allow multiple meter body 20 configurations and applications during initial installation. The rigid, direct attachment of the enclosure 60 to a pipe 30 by way of coupled mating of the bottom bars 62 to the pipe mounting point tabs 36 by the exemplary bottom bar fasteners promotes tight, potentially permanent, affixation without periodic retightening as is often required for installations using known circumferential straps. Conversely, any enclosure 60 may be selectively removed by removal of the bottom bar fasteners 64 or repositioned to another series of mounting tabs 36 arrayed about the pipe 30 without the need to reposition straps or possibly have to compete for circumferential space about the pipe in applications requiring use of multiple strap arrays. See for example the modular meter body 20 configurations shown in FIG. 1 (single transducer enclosure 60), FIG. 7 (double enclosures 60), FIG. 8 (triple enclosures 60), and FIG. 9 (quad enclosures 60).

In addition to selective permanent mounting and dismounting modular transducer enclosure 60 configurations of the meter body 20 of the present invention, an individual transducer enclosure 60 enables internal modular configuration of one or a plurality of transducers or other components for different user applications without the need for auxiliary alignment tools, templates, measuring instruments or other devices. Referring to the exemplary embodiments shown in FIGS. 10-14, a plurality of two known flow meter transducers 90 are incorporated in enclosure 60 in selected orientations. Side rail 66 incorporates one or more integral transducer alignment points, optionally with visible indicia. A service technician merely has to identify the appropriate alignment point for a given transducer application and affix the transducer to the enclosure relative to the alignment point.

In one embodiment of alignment point of the present invention, side rail 66 incorporates one or more indexing spring pins 92 that project laterally into the enclosure 60 interior and function as an axial positioning alignment stop for a transducer 90. In another alignment point embodiment, side rail 66 has an array of indexing holes 94, with optional indexing indicia 96 (see FIG. 11). L-bracket 98 is aligned with a desired indexing hole 94 and fastened to the side rail 66 with L-bracket fastener 100. The L-bracket 98 functions as an axial alignment stop for its associated transducer 90.

The transducers 90 are rigidly affixed in an desired aligned orientation within the transducer enclosure 60 with a laterally oriented transducer mounting clamp 102 that slidably engages in respective grooves 104 in the side rails 66, 68. Transducer clamp fastener assembly 106, which may optionally comprise a male threaded stud laterally captured within a hole formed in the transducer clamp 102 engaging in a female aperture defined by the transducer 90, and tightened vertically along the stud axial length by a hex nut tensions the transducer 90 against the pipe 30 circumference. Optionally a foil vibration damping tape 108 may be applied to the lateral sides of the transducer 90, to attempt to isolate vibrations originating from the environment external the pipe interior.

As discussed in the Background of the Disclosure, above, past metering applications often required specific orientation and calibration of a transducer relative to the pipe by use of auxiliary orientation tools. In the past, known transducer enclosures had to be aligned on a pipe circumference with measuring instruments, such as scales/rulers or alignment templates. After enclosure affixation, transducers also had to be aligned and oriented within the enclosure with measuring instruments and/or templates. In application of some features of the present invention the need for such auxiliary alignment devices is greatly reduced.

Although various embodiments which incorporate the teachings of the present invention have been shown and described in detail herein, those skilled in the art can readily devise many other varied embodiments that still incorporate these teachings.

What is claimed is:

1. A fluid meter body, comprising:
   a pipe for conveyance of fluid, having an exterior circumferential surface;
   at least one mounting point integral with the pipe such that the at least one mounting point is free of a strap, the at least one mounting point comprising an extension from the exterior circumferential surface;
   a bar directly affixed to the at least one mounting point by an attachable and detachable coupling device; and
   a housing coupled to the bar, for attachment of a fluid meter transducer thereto;
   wherein the at least one mounting point is sized to accept the coupling device but smaller in all dimensions of the extension than any dimension of the fluid meter transducer.

2. The fluid meter body of claim 1, wherein the pipe has an array of a plurality of mounting points.

3. The fluid meter body of claim 2, wherein the mounting points are a plurality of tabs projecting from the pipe exterior circumferential surface and the coupling devices are threaded fasteners.

4. The fluid meter body of claim 1, wherein the mounting point is a tab projecting from the pipe exterior circumferential surface and the coupling device is a threaded fastener.

5. The fluid meter body of claim 1, further comprising:
   a pair of generally parallel bars oriented in spaced apart fashion generally axially along the pipe exterior circumference; and
   a pair of side walls coupled respectively to each respective bar, a pair of end caps coupling respective ends of each side wall and a removable cover.

6. The fluid meter body of claim 5, wherein at least one of the side walls is integrally formed with its respective bar.

7. The fluid meter body of claim 5, further comprising means for sealing the housing from the external environment thereof.

8. The fluid meter body of claim 1, further comprising a side wall coupled to the bar.

9. The fluid meter body of claim 8, further comprising a plurality of transducer alignment points defined by and arrayed in the side wall, adapted for orientation and alignment of a transducer.

10. The fluid meter body of claim 9, further comprising alignment indicia proximal the transducer alignment points, for association of a desired transducer orientation and alignment with an alignment point.

11. The fluid meter body of claim 9, wherein the transducer alignment points are selected from a group consisting of apertures formed in the side wall and projections projecting from the side wall.

12. The fluid meter body of claim 11 further comprising a bracket coupled to an aperture alignment point and projecting from the side wall.

13. The fluid meter body of claim 1, further comprising:
   a pair of generally parallel bars oriented in a spaced apart fashion generally axially along the pipe exterior circumference;
   a pair of side walls coupled respectively to each respective bar and defining a pair of opposed, inwardly facing grooves;
   a transducer captured between the side walls; and
   a transducer mounting clamp having respective ends captured in respective grooves and coupled to the transducer.

14. A fluid meter body, comprising:
   a pipe for conveyance of fluid, having an exterior circumferential surface defining an array of a plurality of mounting points, the mounting points each being integral with the pipe such that the mounting points are free of a strap, the mounting points comprising extensions from the exterior circumferential surface;

a pair of generally parallel bottom bars oriented in spaced apart fashion generally axially along the pipe exterior circumference, the bars directly affixed to the mounting point array by attachable and detachable coupling devices; and a housing coupled to the mounting bar, for attachment of a fluid meter transducer thereto.

15. The fluid meter body of claim 14, wherein the housing comprises a pair of side walls coupled respectively to each respective bottom bar.

16. The fluid meter body of claim 15, further comprising a plurality of transducer alignment points defined by and arrayed in a side wall, adapted for selective orientation and alignment of a transducer.

17. The fluid meter body of claim 16, wherein the transducer alignment points are selected from a group consisting of apertures formed in the side wall and projections projecting from the side wall.

18. The fluid meter body of claim 17 further comprising a bracket coupled to an aperture alignment point and projecting from the side wall.

19. The fluid meter body of claim 16, further comprising alignment indicia proximal the transducer alignment points, for association of a desired transducer orientation and alignment with an alignment point.

20. The fluid meter body of claim 14, wherein at least some of the mounting points is a tab projecting from the pipe exterior circumferential surface and the coupling device is a threaded fastener.

21. A method for selectively configuring a modular fluid meter body, comprising:

providing a pipe for conveyance of fluid, having an exterior circumferential surface defining an array of a plurality of mounting points integral with the pipe, the mounting points comprising extensions from the exterior circumferential surface;

orienting a pair of generally parallel bars with first mounting points of the array in spaced apart fashion generally axially along the pipe exterior circumference;

affixing the bars directly to the first mounting points of the array with attachable and detachable coupling devices;

coupling a housing to the bars, the housing having a pair of side walls coupled respectively to each respective bar, at least one of the side walls having a plurality of transducer alignment points defined by and arrayed therein, adapted for orientation and alignment of a transducer;

orienting and aligning at least one transducer in the housing with one of the alignment points; and affixing the at least one transducer in the housing at the alignment point.

22. The method of claim 21 further comprising sealing the housing from the external environment thereof.

* * * * *